United States Patent
Walsh et al.

(10) Patent No.: US 10,269,046 B1
(45) Date of Patent: Apr. 23, 2019

(54) NETWORKED ENVIRONMENT THAT ENABLES INTERACTION BETWEEN CONTENT REQUESTORS AND CONTENT CREATORS

(71) Applicant: Amazon Technologies, Inc., Seattle, WA (US)

(72) Inventors: Liza Marie Walsh, Seattle, WA (US); Michael Lee Herst, Shoreline, WA (US); Jeffrey Clarke Purcell, Seattle, WA (US); Amber Autrey Taylor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 585 days.

(21) Appl. No.: 14/940,140

(22) Filed: Nov. 12, 2015

(51) Int. Cl.
*G06Q 30/00* (2012.01)
*G06Q 30/02* (2012.01)
*G06F 3/0484* (2013.01)

(52) U.S. Cl.
CPC ....... *G06Q 30/0276* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 2010/0121727 | A1* | 5/2010 | Butler | G06Q 30/06 705/26.1 |
| 2011/0112911 | A1* | 5/2011 | Birnholz | G06Q 30/02 705/14.69 |
| 2015/0206170 | A1* | 7/2015 | Karande | G06Q 30/0242 705/14.41 |
| 2015/0220748 | A1* | 8/2015 | Leach | G06F 21/608 726/26 |

\* cited by examiner

*Primary Examiner* — Alvin L Brown
(74) *Attorney, Agent, or Firm* — Eversheds Sutherland (US) LLP

(57) ABSTRACT

Systems, methods, and computer-readable media are provided for implementing a networked environment that enables interaction between content requestors and content creators. The networked environment may be an online content exchange marketplace that content requestors may access to submit requests for content and receive bid proposals from content creators that identify proposed content to be generated. A content requestor may accept a bid proposal from a particular content creator and may receive the content from the content creator via the online content exchange marketplace. The content requestor may then submit a request to publish the content. Publishing the content may include making the content accessible to users via a content sharing platform.

17 Claims, 5 Drawing Sheets

NETWORKED ENVIRONMENT THAT ENABLES INTERACTION BETWEEN CONTENT REQUESTORS AND CONTENT CREATORS

BACKGROUND

Online advertising content may include text content, graphical content, audio content, video content, or combinations thereof. One or more products or services may be marketed under a brand. An entity associated with the brand (e.g., a manufacturer) may generate advertising content to promote products or services marketed under the brand or may utilize a third-party advertiser to generate the advertising content.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
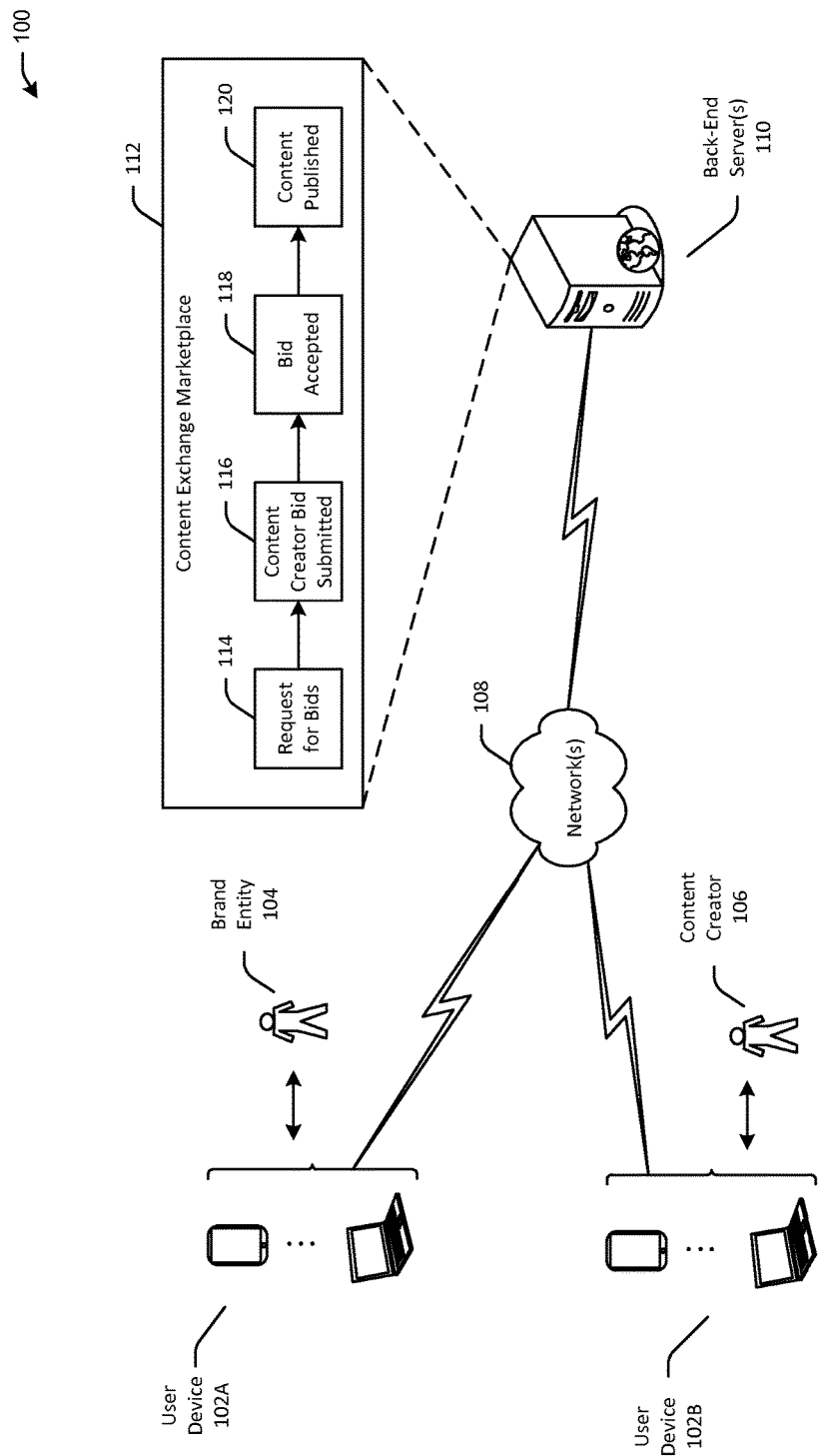
FIG. 1 depicts an example networked environment that enables interaction between content requestors and content creators in accordance with one or more example embodiments of the disclosure.

This disclosure relates to, among other things, systems, methods, and computer-readable media for implementing a networked environment that enables interaction between content requestors and content creators. In certain example embodiments, the networked environment may be an online content exchange marketplace that content requestors may access to submit requests for content and receive bid proposals from content creators that identify proposed content to be generated. A content requestor may accept a bid proposal from a particular content creator and may receive the content from the content creator via the online content exchange marketplace. The content requestor may then submit a request to publish the content. Publishing the content may include making the content accessible to users via a content sharing platform. In certain example embodiments, the content sharing platform may form part of the online content exchange marketplace or vice versa.

In an example embodiment, an entity associated with a brand (e.g., an advertiser) may access a profile associated with the online content exchange marketplace. For example, the brand entity may submit authentication credentials (e.g., a username; a password; other identifying information such as a name, an email address, and so forth; etc.) via a first user interface (e.g., a web page) in order to access a corresponding profile (hereinafter referred to as a "brand entity profile"). It should be appreciated that the brand entity may be an individual acting in a representative capacity on behalf of an organization associated with the brand.

Upon accessing the brand entity profile, a second user interface may be presented that identifies a calendar of predetermined events. The events may include seasonal promotional events associated with, for example, particular holidays. For example, the events may include a "Black Friday" event associated with promotions available in connection with the Thanksgiving holiday. The events may additionally, or alternatively, include events centered around particular themes. For example, the events may include a "Back to School" event or a "Fall Fashion Week" event.

The brand entity may utilize the second interface to submit a request for bids from content creators to generate videos to promote a brand associated with the brand entity. In certain example embodiments, the brand entity may select a particular event from the calendar of events to sponsor and with which to associate the request for bids to generate videos. For example, the brand entity may select a "Fall Fashion Week" event and submit a request for bids to generate videos that are related to this event. In particular, the brand entity may specify attribute information indicative of one or more desired attributes for the video. The attribute(s) may include one or more content characteristics that the video must include. The content characteristics may include particular thematic elements that are related to the selected event. For example, if the selected event is a "Fall Fashion Week" event, the brand entity may specify that the video should include content that focuses on a type of clothing relevant to fall fashion trends. As another example, if the selected event is a "Back to School" event and the brand entity is seeking to promote its tablet devices, the content characteristics may include a requirement that the video include content that relates to how tablet devices can enhance the educational experience.

In other example embodiments, rather than select from a predetermined set of events, the brand entity may submit a recommendation for a new event to sponsor. The brand entity may associate a request for bids to generate videos with such a recommended new event. In still other example embodiments, the brand entity may submit a request for bids to generate videos that promote its brand, where the request is not associated with a promotional event. For example, the brand entity may submit a request for bids to generate videos that promote one or more products or services marketed under its brand.

As part of submitting the request for bids to generate videos, the brand entity may specify filtering criteria. A back-end system associated with the online content exchange marketplace (e.g., one or more servers) may evaluate content creator profiles associated with the marketplace against the filtering criteria to determine which content creator profile(s) satisfy the filtering criteria. The filtering criteria may include targeting criteria such as a target demographic (e.g., age range, geographic region, user tastes/preferences, etc.) to whom the brand entity wishes to target the videos. The back-end system may determine that a content creator profile satisfies such targeting criteria if a threshold number of previous videos generated by the content creator profile were targeted to users based on the same or similar targeting criteria.

The filtering criteria may further include criteria relating to social networking attributes of content creator profiles. For example, the filtering criteria may specify a minimum threshold number of social networking profiles that must be linked to a content creator profile on one or more social networking platforms in order for the content creator profile to be eligible for submitting a bid proposal to generate a video. As another example, the filtering criteria may include criteria relating to the extent of activity of a content creator profile on one or more electronic commerce platforms (e.g., an e-commerce platform operated by a same entity that operates the online content exchange marketplace). For example, the filtering criteria may specify a minimum threshold number of product reviews that must be associated with a content creator profile in order for the content creator profile to be eligible for submitting a bid proposal to generate a video.

The back-end system may make the attribute information specified in the request received from the brand entity accessible to each content creator profile that satisfies the filtering criteria associated with the request. More specifically, when a content creator accesses a corresponding content creator profile, a user interface may be presented that identifies each bid request for which the content creator profile satisfies associated filtering criteria. For each such bid request, a user-selectable widget (e.g., button, link, etc.) may be provided that responsive to selection may cause attribute information associated with the bid request to be displayed.

A content creator may submit a bid proposal in response to a bid request. The bid proposal may include a text description of the video that the content creator intends to generate. The text description may specify the manner in which the content creator intends to incorporate desired attributes (e.g., content characteristics) into the video. For example, if the bid request is associated with a "Fall Fashion Week" event and the attribute information indicates that the video should include content that focuses on a type of clothing relevant to fall fashion trends, the bid proposal may indicate that the video will focus on light jackets. The bid proposal may further indicate one or more thematic elements that the video will address in connection with light jackets (e.g., the versatility of light jackets for different fall activities). In certain example embodiments, the bid proposal may include sample video content that provides a preview of the content that the content creator intends to generate, one or more previous videos generated by the content creator, and so forth. A content creator may submit a bid proposal via its corresponding content creator profile.

A brand entity may access and accept, via its corresponding brand entity profile, one or more bid proposals submitted in response to a bid request. Upon receiving an indication of acceptance of a bid proposal, the back-end system may send a notification to the content creator profile via which the bid proposal was submitted indicating that the bid proposal was accepted. The content creator that submitted the accepted bid proposal may then generate the video and submit the video via its content creator profile for evaluation by the brand entity. In certain example embodiments, the brand entity may request modification(s) to the video, in which case, the content generated by the content creator may be subjected to multiple rounds of review.

After the brand entity approves of the video, the brand entity may submit, via its corresponding brand entity profile, a request to publish the video. The request may include or otherwise be associated with product information that identifies one or more products to associate with the video. In certain example embodiments, the product information may indicate the type of product marketed under the brand that the brand entity wishes to associate with the video, in which case, the back-end system may identify a corresponding product identifier (e.g., an Amazon Standard Identification Number (ASIN)) and associate the product identifier with the video. Linking a product identifier to the video may include providing a link to a product detail page associated with the product identified by the product identifier within the video content or in association with the video (e.g., on a web page in proximity to a window in which the video can be played). In other example embodiments, the product information may directly specify one or more product identifiers. Further, in certain example embodiments, the brand entity may request that a brand logo be included in or otherwise associated with the video content. This request may form part of the request to publish the video or may be specified as part of the attribute information associated with the original request for bids.

The back-end system may cause the video to be published on a content sharing platform. As previously noted, the content sharing platform may form part of the online content exchange marketplace or vice versa. The back-end system may send a notification to a content creator profile via which the video was submitted indicating that the video has been published. Thereafter, the content creator may drive user traffic to the published video via one or more social networking platforms. For example, the content creator may post a link that redirects to a web page on which the video can be viewed on a social networking profile page corresponding to a social networking profile associated with the content creator or a social networking profile that is linked to a social networking profile associated with the content creator.

In certain example embodiments, the content creator may be compensated in accordance with a revenue generation model based on one or more performance metrics. The performance metrics may include, for example, a number of links to the video content on one or more social networking profiles associated with the content creator profile, a number of unique views of the video, a number of product purchases that are associated with at least one unique view of the video content, and so forth.

Brand entity profiles and content creator profiles are described herein in connection with an online content exchange marketplace. In certain example embodiments, a brand entity profile and/or a content creator profile may be a profile that is unique to the content exchange marketplace. In other example embodiments, a brand entity profile and/or a content creator profile may be a profile established in connection with another platform (e.g., a social networking profile, a customer profile on an e-commerce platform, etc.), but which can be used to access to online content exchange marketplace. Brand entity profiles and content creator profiles may be referred to herein interchangeably as marketplace brand entity profiles and marketplace content creator profiles, respectively.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS

Figure 2:
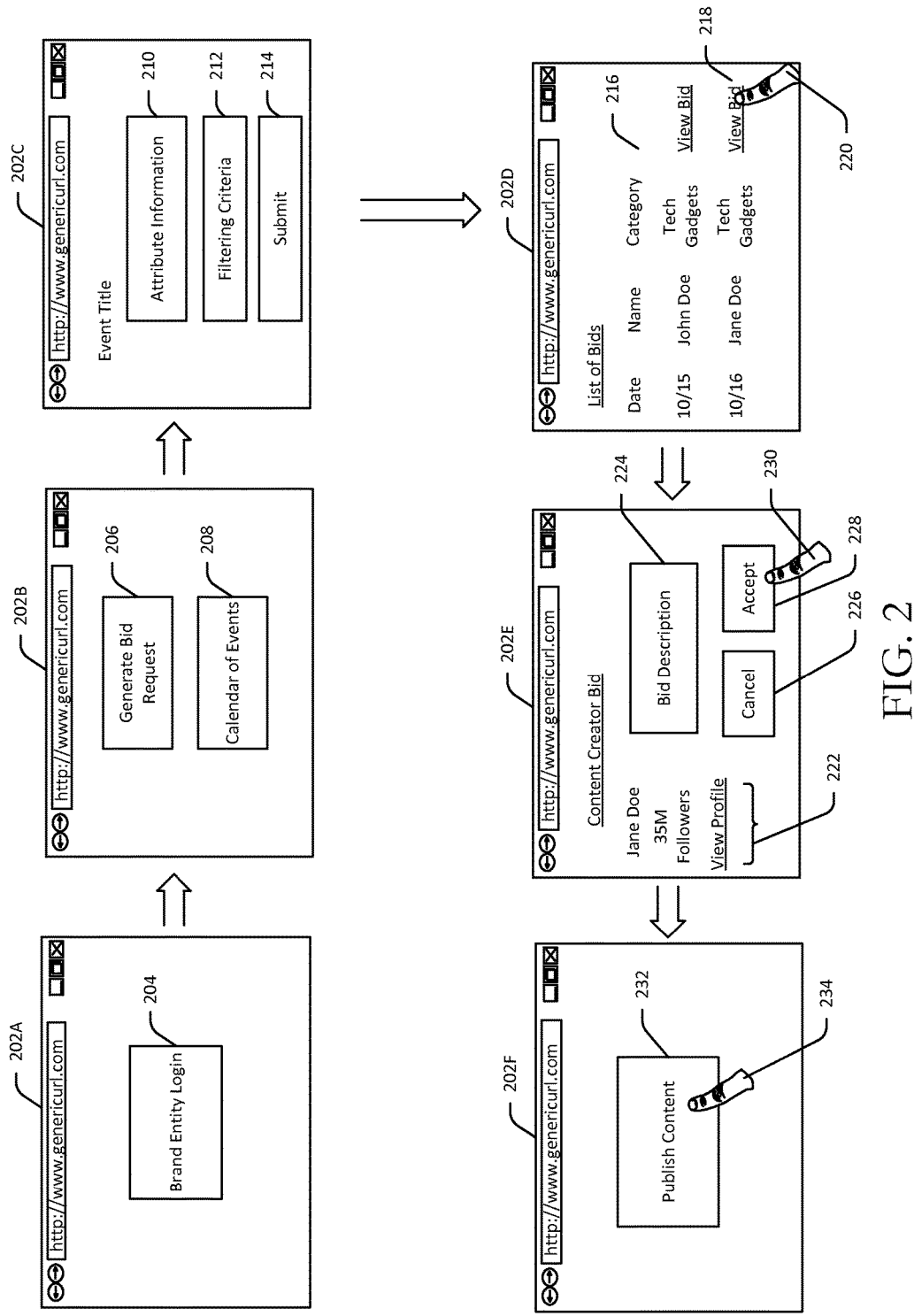
FIG. 2 depicts a series of illustrative user interfaces for generating a campaign, viewing bids to generate content to promote the campaign, accepting a particular bid, and publishing content associated with the particular bid in accordance with one or more example embodiments of the disclosure.
Figure 3:
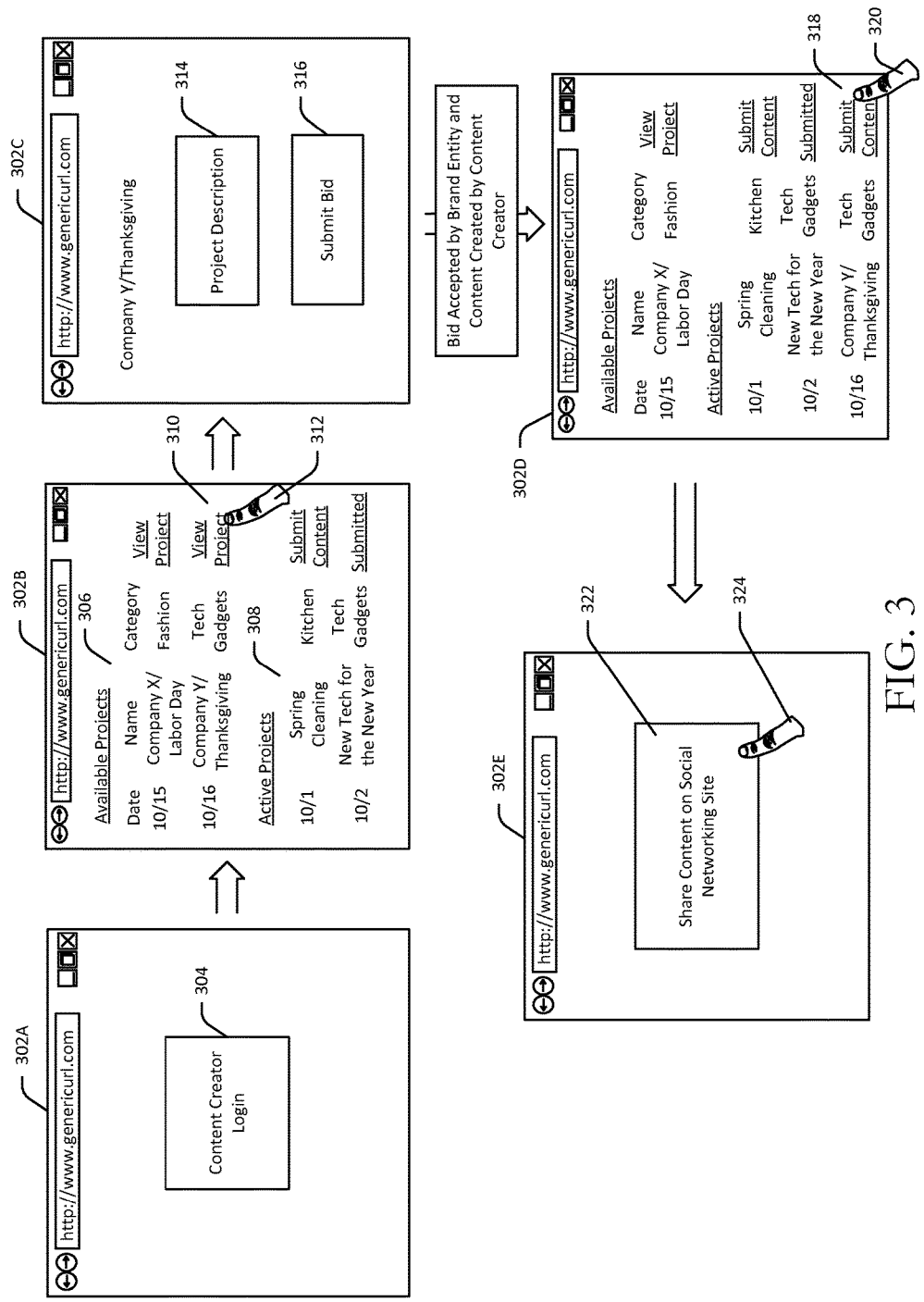
FIG. 3 depicts a series of illustrative user interfaces for viewing information associated with a campaign, submitting a bid to generate content to promote the campaign, receiving an indication of acceptance of the bid, and sharing the generated content on a social networking platform in accordance with one or more example embodiments of the disclosure.

FIG. 1 depicts an example networked environment 100 that enables interaction between content requestors and content creators in accordance with one or more example embodiments of the disclosure. FIG. 2 depicts a series of illustrative user interfaces for generating a campaign, viewing bids to generate content to promote the campaign, accepting a particular bid, and publishing content associated with the particular bid in accordance with one or more example embodiments of the disclosure. FIG. 3 depicts a series of illustrative user interfaces for viewing information associated with a campaign, submitting a bid to generate content to promote the campaign, receiving an indication of acceptance of the bid, and sharing the generated content on a social networking platform in accordance with one or more example embodiments of the disclosure. FIGS. 1-3 will be described hereinafter, at certain points, in conjunction with one another.

The example networked environment 100 may include one or more back-end servers 110, a first user device 102A, and a second user device 102B. While the back-end server(s) 110 may be referred to herein in the singular, it should be appreciated that multiple back-end servers may form part of the networked environment 100. Further, it should be appreciated that any number of user devices may form part of the networked environment 100. The back-end server 110, the first user device 102A, and the second user device 102B may be communicatively coupled via one or more networks 108. The network(s) 108 may include any of the types of networks and/or types of communication media described in more detail later in this disclosure in reference to network(s) 506 depicted in FIG. 5.

The user device 102A and the user device 102B may each be any suitable computing device including, but not limited to, a smartphone, a tablet, a laptop computer, a desktop computer, a personal digital assistant, a wearable computing device, a content streaming device, a gaming console, or any other device configured to execute a browser application (mobile or traditional), a dedicated mobile application, a fat-client application, or the like. In certain example embodiments, the back-end server 110 may provide the user device 102A and the user device 102B with access to a content exchange marketplace 112. For example, respective client applications executable on the user device 102A and the user device 102B may be configured to interact with a server application executable on the back-end server 110 to provide access to the content exchange marketplace 112.

In certain example embodiments, a brand entity 104 (e.g., an advertiser)—or an individual acting in a representative capacity on behalf of the brand entity—may utilize the user device 102A to access the content exchange marketplace 112 via the back-end server 110. Similarly, a content creator may utilize the user device 102B to access the content exchange marketplace 112 via the back-end server 110. More specifically, as depicted in FIG. 2, a brand entity 104 may access a corresponding brand entity profile associated with the content exchange marketplace 112 by submitting authentication credentials in one or more data fields 204 of a user interface 202A rendered by a client application executing on the user device 102A. Similarly, as depicted in FIG. 3, a content creator may access a corresponding content creator profile associated with the content exchange marketplace 112 by submitting authentication credentials in one or more data fields 304 of a user interface 302A rendered by a client application executing on the user device 102B.

In certain example embodiments, upon accessing a corresponding brand entity profile, the client application executing on the user device 102A may render a series of user interfaces via which the brand entity may submit a request 114 for bids from content creators to generate content. More specifically, referring again to FIG. 2, upon accessing the corresponding brand entity profile, the client application may render the user interface 202B on the user device 102A. The user interface 202B may identify a calendar of predetermined events 208. The events may include seasonal promotional events associated with, for example, particular holidays. The events may additionally, or alternatively, include events centered around particular themes. The user interface 202B may further include a selectable widget 206 for generating the request 114 that responsive to selection may cause a user interface 202C to be rendered by the client application executing on the user device 102A. The brand entity may specify information associated with the bid request and ultimately submit the bid request via the user interface 202C.

In particular, the brand entity 104 may utilize the user interfaces 202B, 202C to submit a request for bids from content creators to generate content to promote a brand associated with the brand entity 104. In certain example embodiments, the brand entity 104 may select a particular event from the calendar of events 208 to sponsor and with which to associate the request 114. In certain example embodiments, the brand entity 104 may specify attribute information 210 indicative of one or more desired attributes for the content. The attribute(s) may include one or more content characteristics that the content must include. The content characteristics may include particular thematic elements that are related to the selected event. In other example embodiments, rather than select from a predetermined set of events, the brand entity 104 may submit a recommendation for a new event to sponsor. The brand entity 104 may associate the request 114 with such a recommended new event. In still other example embodiments, the brand entity 104 may submit the request 114 to specifically promote one or more products or services marketed under its brand. In such example embodiments, the request 114 may not be associated with a promotional event. In certain example embodiments, the attribute information 210 may further include various other parameters associated with the request 114 such as, for example, a budget associated with the request 114, a requested delivery schedule, and so forth.

As part of submitting the request for bids to generate videos, the brand entity 104 may also specify filtering criteria 212 via the user interface 202C. The back-end server 110 may evaluate content creator profiles associated with the marketplace 112 against the filtering criteria 212 to determine which content creator profile(s) satisfy the filtering criteria 212. The filtering criteria 212 may include targeting criteria such as a target demographic (e.g., age range, geographic region, user tastes/preferences, etc.) to whom the brand entity 104 wishes to target the content. The back-end server 110 may determine that a content creator profile satisfies such targeting criteria if a threshold amount of content previously generated by the content creator profile was targeted to users based on the same or similar targeting criteria.

The filtering criteria 212 may further include criteria relating to social networking attributes of content creator profiles. For example, the filtering criteria 212 may specify a minimum threshold number of social networking profiles that must be linked to a content creator profile on one or more social networking platforms in order for the content creator profile to be eligible for submitting a bid proposal to generate content. As another example, the filtering criteria 212 may include criteria relating to the extent of activity of a content creator profile on one or more e-commerce platforms (e.g., an e-commerce platform operated by a same entity that operates the online content exchange marketplace 112). For example, the filtering criteria 212 may specify a minimum threshold number of product reviews that must be associated with a content creator profile in order for the content creator profile to be eligible for submitting a bid proposal to generate content.

Upon specifying the attribute information 210 and the filtering criteria 212, the brand entity 104 may select a user-selectable widget 214 to submit the request 114. The back-end server 110 may then make the attribute information 210 specified in the request 114 received from the brand entity 104 accessible to each content creator profile that satisfies the filtering criteria 212 associated with the request 114. More specifically, referring now to FIG. 3, after the content creator 106 accesses a corresponding content creator profile associated with the content exchange marketplace 112 by submitting authentication credentials via the user interface 302A, the client application executing on the user device 102B may render a user interface 302B. The user interface 302B may identify each bid request 306 for which the content creator profile satisfies associated filtering criteria. For each such bid request, a user-selectable widget (e.g., button, link, etc.) may be provided that responsive to selection may cause attribute information associated with the bid request to be presented. The user interface 302B may further present a listing of active projects (e.g., previous bid proposals that have been accepted and in connection with which content has been or is being generated).

Upon selection 312 of a particular user-selectable widget 310, the client application executing on the user device 102B may render a user interface 302C that presents information associated with the corresponding bid request (e.g., request 114). In particular, the user interface 302C may provide a description 314 of the bid request. The description 314 may include text, graphics, audio content, video content, or any combination thereof. In certain example embodiments, the description 314 may include at least a portion of the attribute information 210. The content creator 106 may select a user-selectable widget 316 presented on the user interface 302C to submit a bid proposal 116 in response to the corresponding bid request 114.

Referring again to FIG. 2, the brand entity 104 may access a user interface 202D via its corresponding brand entity profile. More specifically, the client application executing on the user device 102A may, in response to a user selection, render the user interface 202D. The user interface 202D may present a listing of bid proposals submitted in response to bid requests submitted via the brand entity profile. For example, the user interface 202D may identify one or more bid proposals (including the bid proposal 116) submitted in response to the request 114. The user interface 202D may include a respective user-selectable widget associated with each identified bid proposal that responsive to selection may cause a user interface to be presented that includes more detailed information pertaining to the bid proposal. For example, selection 220 of a user-selectable widget 218 associated with the bid proposal 116 may cause a user interface 202E to be presented.

The user interface 202E may present detailed information associated with the bid proposal 116. For example, the user interface 202E may include a description 224 of the content that the content creator 106 intends to generate for the request 114. The description 224 may include a text description that specifies the manner in which the content creator 106 intends to incorporate desired attributes (e.g., content characteristics) into the content. In certain example embodiments, the description 224 may include sample video content that provides a preview of the content that the content creator 106 intends to generate, previous content generated by the content creator 106, and so forth. The user interface 202E may further present information 222 associated with the content creator profile via which the bid proposal 116 was submitted. Such information 222 may include, for example, identifying information for the content creator profile (e.g., a profile name); an indication of number of social networking profiles linked to the content creator profile (or to a social networking profile of the content creator 106), which optionally, may be broken down by social networking platform; and so forth. Such information 222 may further include a user-selectable widget that responsive to selection redirects the client application executing on the user device 102A to a user interface that provides additional information pertaining to the content creator profile (e.g., previous content generated by the content creator 106; historical performance metrics; product reviews associated with the content creator 106; and so forth). The bid proposal 116 may further include a requested budget to generate the proposed content.

The user interface 202E may further include a user-selectable widget 226 for rejecting the bid proposal 116 and a user-selectable widget 228 for accepting the bid proposal 116. Upon selection 230 of the widget 228, the back-end server 110 may receive an indication 118 of acceptance of the bid proposal 116 and may send a notification to the content creator profile via which the bid proposal 116 was submitted indicating that the bid proposal 116 was accepted. The content creator 106 that submitted the accepted bid proposal 116 may then generate corresponding content and submit the content via its content creator profile for evaluation by the brand entity 104. More specifically, the project corresponding to the accepted bid proposal 116 may be transitioned from a listing of "available projects" to a listing of "active projects" in the user interface 302D accessible via the content creator profile. The user interface 302D may include a user-selectable widget 318 associated with the accepted bid proposal 116 that responsive to selection 320 may cause the content to be transmitted to the back-end server 110. The back-end server 110 may then make the content accessible to the brand entity 104 via its corresponding brand entity profile. In certain example embodiments, the brand entity may request modification(s) to the video, in which case, the content generated by the content creator 106 may be subjected to multiple rounds of review.

After the brand entity 104 approves of the generated content, the brand entity 104 may submit, via its corresponding brand entity profile, a request to publish the content. For example, a user interface 202F accessible via the brand entity profile may include a user-selectable widget 232 that responsive to selection 234 may cause a request to publish the content to be submitted to the back-end server 110. The request may include or otherwise be associated with product information that identifies one or more products to associate with the content. In certain example embodiments, the product information may indicate the type of product marketed under the brand that the brand entity 104 wishes to associate with the content, in which case, the back-end server 110 may identify a corresponding product identifier (e.g., an ASIN) and associate the product identifier with the content. Linking a product identifier to the content may include providing a link to a product detail page associated with the product identified by the product identifier within the content (e.g., within video content) or in association with the content (e.g., on a web page in proximity to a window in which the content is presented). In other example embodiments, the product information may directly specify one or more product identifiers. Further, in certain example embodiments, the brand entity 104 may request that a brand logo be included in or otherwise associated with the content. This request may form part of the request to publish the video or may be specified as part of the attribute information 210 associated with the request 114.

In certain example embodiments, the back-end server 110 may cause the video to be published on a content sharing platform. As previously noted, the content sharing platform may form part of the online content exchange marketplace 112 or vice versa. Upon publication of the content, the back-end server 110 may send a notification 120 to the content creator profile via which the content was submitted indicating that the content has been published. Thereafter, the content creator 106 may drive user traffic to the published content via one or more social networking platforms. For example, the content creator may post a link that redirects to a web page on which the content can be viewed on a social networking profile page corresponding to a social networking profile associated with the content creator 106 or a social networking profile that is linked to a social networking profile associated with the content creator 106. In certain example embodiments, the content creator 106 may access a user interface 302E via its corresponding content creator profile. The user interface 302E may include a user-selectable widget 322 that responsive to selection 324 may cause the content to be shared on one or more social networking platforms.

In certain example embodiments, the content creator 106 may be compensated in accordance with a revenue generation model based on one or more performance metrics. The performance metrics may include, for example, a number of links to the content on one or more social networking profiles associated with the content creator profile, a number of unique views of the content, a number of product purchases that are associated with at least one unique view of the content, and so forth.

Illustrative Process

Figure 4:
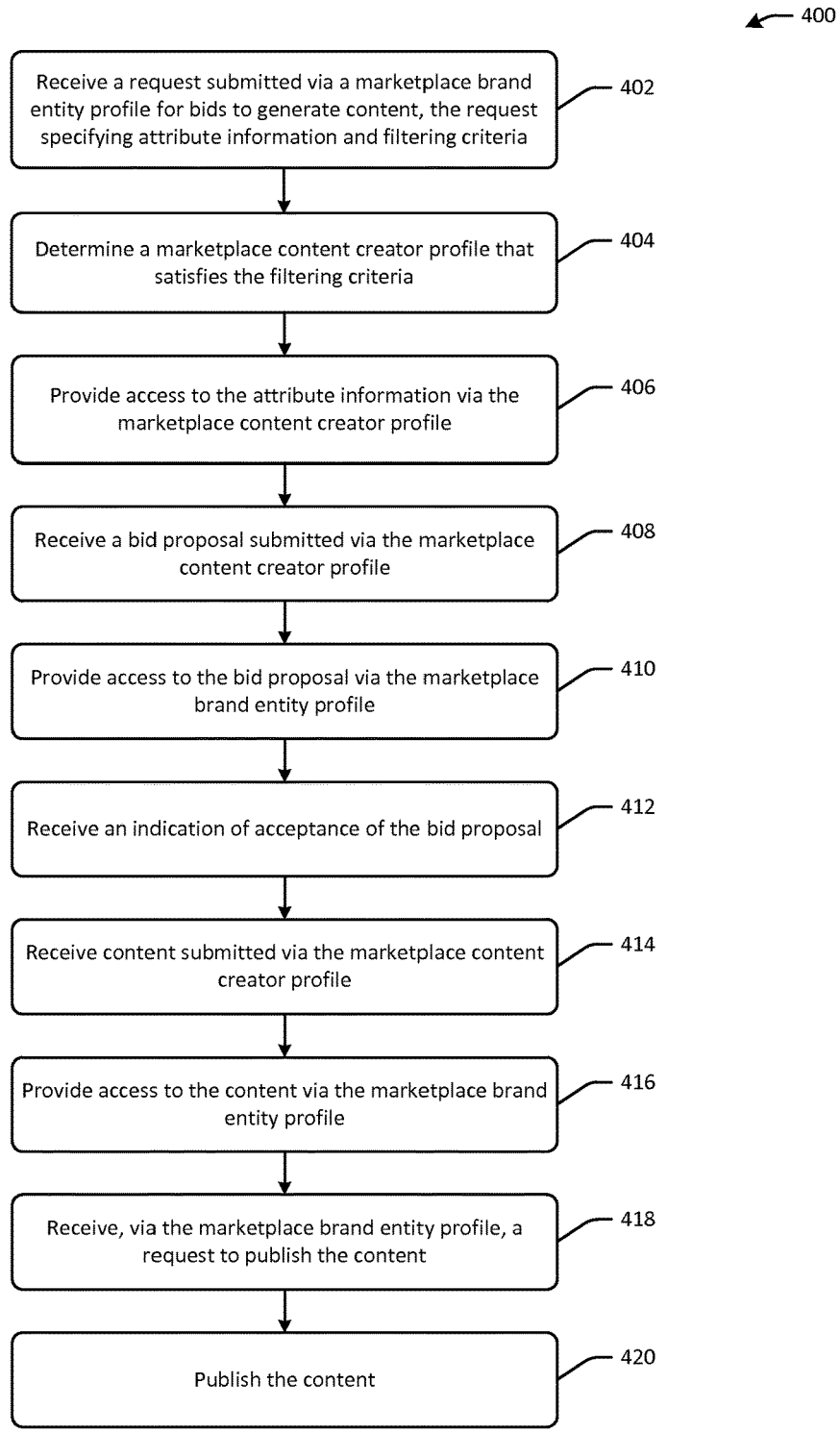
FIG. 4 depicts a process flow of an illustrative method in accordance with one or more example embodiments of the disclosure.

FIG. 4 depicts a process flow of an illustrative method 400 in accordance with one or more example embodiments of the disclosure. In certain example embodiments, one or more operations of the method 400 may be performed by the back-end server 110, or more specifically, by a server application executing on the back-end server 110.

At block 402, the back-end server 110 may receive a request submitted via advertiser marketplace brand entity profile for bids to generate content. The request may be associated with a promotional event. The requested content may be advertising content to promote a brand, or more specifically, one or more products or services marketed under the brand. The request may be associated with an advertising campaign. The request may specify attribute information and filtering criteria. The attribute information may include any of the types of information previously described as attribute information. Similarly, the filtering criteria may include any of the types of filtering criteria previously described.

At block 404, the back-end server 110 may determine a marketplace content creator profile that satisfies the filtering criteria. At block 406, the back-end server 110 may provide access to the attribute information via the content creator profile. In particular, a content creator associated with the content creator profile may be able to access, via the content creator profile, the attribute information associated with the request for bids to generate content.

At block 408, the back-end server 110 may receive a bid proposal submitted via the content creator profile. The bid proposal may include a description of the content to be generated, sample content that provides a preview of the content to be generated, an indication of previous content generated by the content creator, and so forth.

At block 410, the back-end server 110 may provide access to the bid proposal via the brand entity profile. In particular, a brand entity may be able to access detailed information associated with the bid proposal via the brand entity profile.

At block 412, the back-end server 110 may receive an indication of acceptance of the bid proposal. In particular, the brand entity may indicate acceptance of the bid proposal via its corresponding brand entity profile. At block 414, the back-end server 110 may receive content submitted via the content creator profile. The content may be content generated by the content creator in connection with the accepted bid proposal.

At block 416, the back-end server 110 may provide access to the content via the brand entity profile. If the brand entity deems the content to be acceptable, the brand entity may submit, via the brand entity profile, a request to publish the content, which may be received by the back-end server 110 at block 418. At block 420, the back-end server 110 may cause the content to be published via a content sharing platform.

Illustrative Networked Architecture

Figure 5:
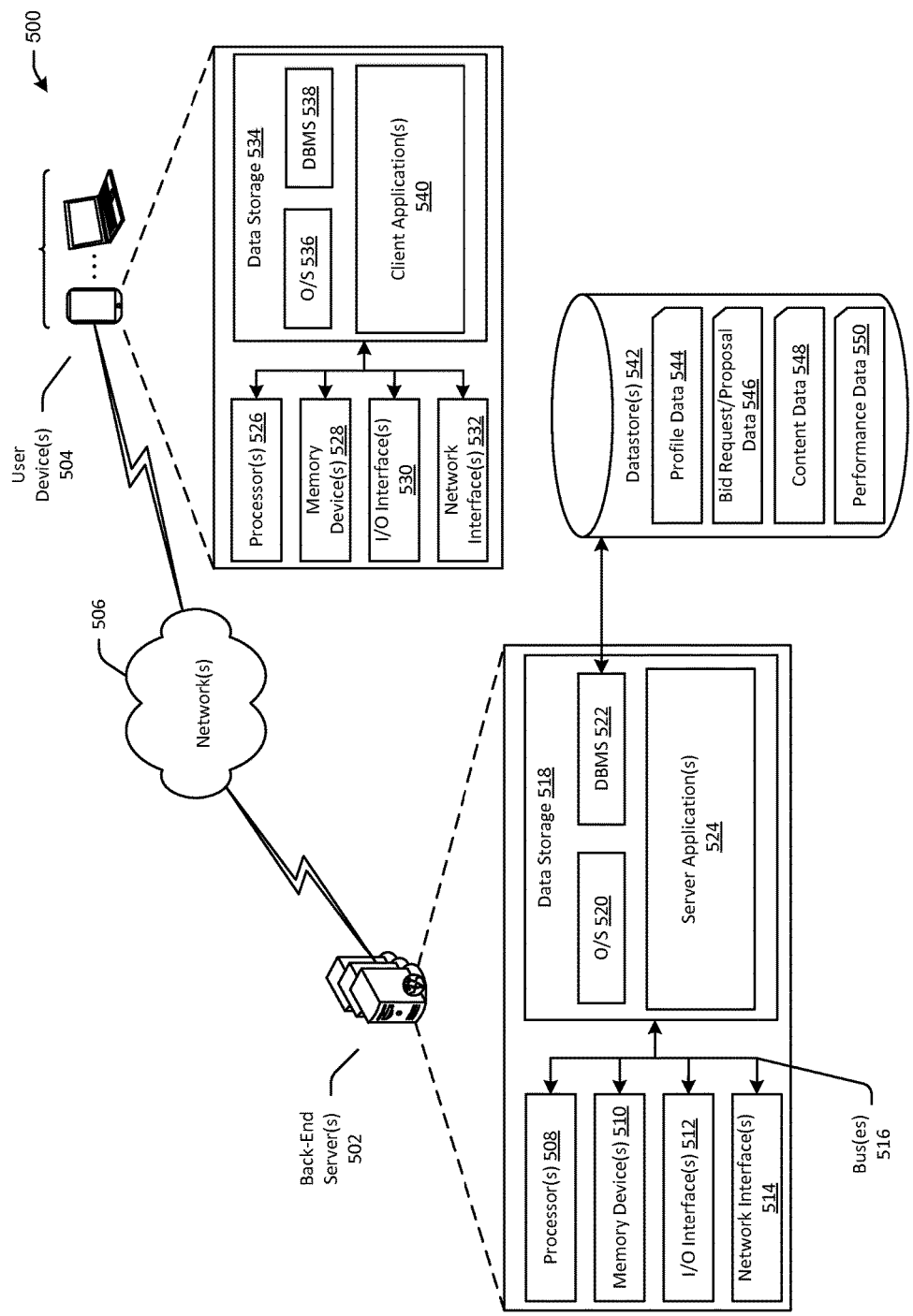
FIG. 5 is a schematic diagram of an illustrative networked architecture in accordance with one or more example embodiments of the disclosure.

FIG. 5 is a schematic diagram of an illustrative networked architecture 500 in accordance with one or more example embodiments of the disclosure. The networked architecture 500 may include one or more back-end servers 502, one or more user devices 504, and one or more datastores 542. One or more users (not shown) may interact with the user device(s) 504. While the back-end server(s) 502 and/or the user device(s) 504 may be referred to herein in the singular, it should be appreciated that multiple ones of any of the illustrative components of the networked architecture 500 may be provided, and any processing described as being performed by a particular component of the architecture 500 may be performed in a distributed manner by multiple such components. In certain example embodiments, the back-end server 502 may correspond to an illustrative configuration of the back-end server 110. Similarly, the user device 504 may correspond to an illustrative configuration of the user device 102A and/or the user device 102B.

The back-end server 502 and the user device 504 may be configured to communicate via one or more networks 506. In addition, a first user device 504 may be configured to communicate with a second user device 504 via the network(s) 506 (and potentially via the back-end server 502). The network(s) 506 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 506 may have any suitable communication range associated therewith and may include, for example, global networks (e.g., the Internet), metropolitan area networks (MANs), wide area networks (WANs), local area networks (LANs), or personal area networks (PANs). In addition, the network(s) 506 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the back-end server 502 may include one or more processors (processor(s)) 508, one or more memory devices 510 (generically referred to herein as memory 510), one or more input/output ("I/O") interface(s) 512, one or more network interfaces 514, and data storage 518. The back-end server 502 may further include one or more buses 516 that functionally couple various components of the server 502. These various components of the server 502 will be described in more detail hereinafter.

The bus(es) 516 may include at least one of a system bus, a memory bus, an address bus, or a message bus, and may permit exchange of information (e.g., data (including computer-executable code), signaling, etc.) between various components of the server 502. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 of the server 502 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 510 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 518 may include removable storage and/or non-removable storage including, but not limited to, magnetic storage, optical disk storage, and/or tape storage. The data storage 518 may provide non-volatile storage of computer-executable instructions and other data. The memory 510 and the data storage 518, removable and/or non-removable, are examples of computer-readable storage media (CRSM) as that term is used herein.

The data storage 518 may store computer-executable code, instructions, or the like that may be loadable into the memory 510 and executable by the processor(s) 508 to cause the processor(s) 508 to perform or initiate various operations. The data storage 518 may additionally store data that may be copied to memory 510 for use by the processor(s) 508 during the execution of the computer-executable instructions. Moreover, output data generated as a result of execution of the computer-executable instructions by the processor(s) 508 may be stored initially in memory 510, and may ultimately be copied to data storage 518 for non-volatile storage.

More specifically, the data storage 518 may store one or more operating systems (O/S) 520; one or more database management systems (DBMS) 522; and one or more program modules, applications, engines, or the like such as, for example, one or more server applications 524. A server application 524 may include computer-executable code, instructions, or the like that may be loaded into the memory 510 for execution by one or more of the processor(s) 508. A server application 524 may enable any of the functionality described earlier in connection with the back-end server 502. In addition, any data stored in one or more datastore(s) 542 may be accessed via the DBMS 522, stored in the data storage 518, and loaded in the memory 510 for use by the processor(s) 508 in executing computer-executable code of any of the program modules.

The datastore(s) 542 may include, without limitation, databases (e.g., relational, object-oriented, etc.), file systems, flat files, distributed datastores in which data is stored on more than one node of a computer network, peer-to-peer network datastores, or the like. The datastore(s) 542 may store various types of data such as, for example, profile data 544 relating to brand entity profiles and/or content creator profiles, bid request/proposal data 546, content data 548, and performance data 550. Any data stored in the datastore(s) 542 may be generated by the back-end server 502 and/or the user device 504. Further, any data stored in the datastore(s) 542 may be generated by one component of the networked architecture 500, stored in the datastore(s) 542, and retrieved from the datastore(s) 542 by another component of the networked architecture 500.

The processor(s) 508 may be configured to access the memory 510 and execute computer-executable instructions loaded therein. For example, the processor(s) 508 may be configured to execute computer-executable instructions of the various program modules of the server 502 to cause or facilitate various operations to be performed in accordance with one or more embodiments of the disclosure. The processor(s) 508 may include any suitable processing unit capable of accepting data as input, processing the input data in accordance with stored computer-executable instructions, and generating output data. The processor(s) 508 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 may be capable of supporting any of a variety of instruction sets.

Referring now to other illustrative components depicted as being stored in the data storage 518, the O/S 520 may be loaded from the data storage 518 into the memory 510 and may provide an interface between other application software executing on the server 502 and hardware resources of the server 502. More specifically, the O/S 520 may include a set of computer-executable instructions for managing hardware resources of the server 502 and for providing common services to other application programs (e.g., managing memory allocation among various application programs). The O/S 520 may include any operating system now known or which may be developed in the future including, but not limited to, any server operating system, any mainframe operating system, or any other proprietary or non-proprietary operating system.

The DBMS 522 may be loaded into the memory 510 and may support functionality for accessing, retrieving, storing, and/or manipulating data stored in the memory 510 and/or data stored in the data storage 518. The DBMS 522 may use any of a variety of database models (e.g., relational model, object model, etc.) and may support any of a variety of query languages. The DBMS 522 may access data represented in one or more data schemas and stored in any suitable data repository.

Referring now to other illustrative components of the server 502, one or more input/output (I/O) interfaces 512 may be provided that may facilitate the receipt of input information by the server 502 from one or more I/O devices as well as the output of information from the server 502 to the one or more I/O devices. The I/O devices may include, for example, one or more user interface devices that facilitate interaction between a user and the server 502 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The server 502 may further include one or more network interfaces 514 via which the server 502 may communicate with any of a variety of other systems, platforms, networks, devices, and so forth. Such communication may occur via any of one or more of the network(s) 506.

The user device(s) 504 may any suitable user device including, but not limited to, a laptop or desktop computer, a tablet device, a smartphone, a content streaming device, a wearable computing device, or the like. In an illustrative configuration, a user device 504 may include one or more processors (processor(s)) 526, one or more memory devices 528 (generically referred to herein as memory 528), one or more I/O interface(s) 530, one or more network interfaces 532, and data storage 534. The processor(s) 526 may correspond to any of the types of processors described in reference to the processor(s) 508 of the back-end server 502. Similarly, the memory 528 may include any of the types of memory described in reference to the memory 510 of the back-end server 502, the I/O interface(s) 530 may include any of the types of I/O interface(s) described in reference to the I/O interface(s) 512 of the back-end server 502, the network interface(s) 532 may include of the types of network interface(s) described in reference to the network interface(s) 514 of the back-end server 502, and the data storage 534 may include any of the types of data storage described in reference to the data storage 518 of the back-end server 502. The user device 504 may further include one or more buses (not labeled) that functionally couple various components of the user device 504 and that may include of the types of buses described in reference to the bus(es) 516 of the back-end server 502.

The data storage 534 may store computer-executable code, instructions, or the like that may be loadable into the memory 528 and executable by the processor(s) 526 to cause the processor(s) 526 to perform or initiate various operations. The data storage 534 may additionally store data that may be copied to memory 528 for use by the processor(s) 526 during the execution of the computer-executable instructions. Moreover, output data generated as a result of execution of the computer-executable instructions by the processor(s) 526 may be stored initially in memory 528, and may ultimately be copied to data storage 534 for non-volatile storage.

More specifically, the data storage 534 may store one or more operating systems (O/S) 536; one or more DBMS 538; and one or more program modules, applications, engines, or the like such as, for example, one or more client applications 540. A client application 540 may include computer-executable code, instructions, or the like that may be loaded into the memory 528 for execution by one or more of the processor(s) 526. A client application 540 may enable any of the functionality described earlier in connection with a user device (e.g., the user device 102A, the user device 102B, etc.). In addition, any data stored in the datastore(s) 542 may be accessed via the DBMS 538, stored in the data storage 534, and loaded in the memory 528 for use by the processor(s) 526 in executing computer-executable code of any of the program modules.

Referring now to other illustrative components depicted as being stored in the data storage 534, the O/S 536 may be loaded from the data storage 534 into the memory 528 and may provide an interface between other application software executing on the user device 504 and hardware resources of the user device 504. More specifically, the O/S 536 may include a set of computer-executable instructions for managing hardware resources of the user device 504 and for providing common services to other application programs (e.g., managing memory allocation among various application programs). The O/S 536 may include any operating system now known or which may be developed in the future including, but not limited to, any server operating system, any mainframe operating system, or any other proprietary or non-proprietary operating system.

The DBMS 538 may be loaded into the memory 528 and may support functionality for accessing, retrieving, storing, and/or manipulating data stored in the memory 528 and/or data stored in the data storage 534. The DBMS 538 may use any of a variety of database models (e.g., relational model, object model, etc.) and may support any of a variety of query languages. The DBMS 538 may access data represented in one or more data schemas and stored in any suitable data repository.

It should be appreciated that the program modules, applications, computer-executable instructions, code, or the like depicted in FIG. 5 as being stored in the data storage 518 and/or the data storage 534 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 502, locally on the user device 504, and/or hosted on other computing device(s) accessible via one or more of the network(s) 506, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that any of the components of the networked architecture 500 may include alternate and/or additional hardware, software, or firmware components beyond those described or depicted without departing from the scope of the disclosure. More particularly, it should be appreciated that software, firmware, or hardware components depicted or described as forming part of the server 502 and/or the user device 504 are merely illustrative and that some components may not be present or additional components may be provided in various embodiments. While various illustrative program modules have been depicted and described as software modules stored in data storage 518 and/or the data storage 534, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the method 400 described earlier may be performed by one or more program modules, applications, or the like executing on the server 502 or by one or more program modules, applications, or the like executing on one or more user devices 504. It should further be appreciated that any of the operations of the method 400 may be performed, at least in part, in a distributed manner by one or more servers 502 and one or more user devices 504, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 400 may be performed in the context of the illustrative configuration of the server 502 and/or the illustrative configuration of the user device 504 depicted in FIG. 5, it should be appreciated that such operations may be implemented in connection with numerous other device configurations.

The operations described and depicted in the illustrative method of FIG. 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural properties and/or methodological acts, it is to be understood that the disclosure is not necessarily limited to the specific properties or acts described. Rather, the specific properties and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain properties, elements, and/or steps. Thus, such conditional language is not generally intended to imply that properties, elements, and/or steps are in any way required for one or more embodiments or that one or more embodiments necessarily include logic for deciding, with or without user input or prompting, whether these properties, elements, and/or steps are included or are to be performed in any particular embodiment.

That which is claimed is:

1. A method, comprising:
  receiving, from a first user device via a brand entity profile associated with a content exchange marketplace, a request for bids to generate video content associated with an advertising campaign, wherein the request for bids specifies i) attribute information indicative of one or more desired attributes of the video content and ii)

filtering criteria, and wherein the filtering criteria includes a threshold amount of generated content targeted to a target demographic;
determining that an amount of content targeted to the target demographic generated by a content creator profile associated with the content exchange marketplace satisfies the filtering criteria;
providing the content creator profile with access to the attribute information;
receiving, from a second user device via the content creator profile, a bid proposal including a text description of the video content;
providing the brand entity profile with access to the bid proposal;
receiving, via the brand entity profile, an acceptance of the bid proposal;
receiving, via the content creator profile, the video content;
providing the brand entity profile with access to the video content;
receiving, via the brand entity profile, a request to publish the video content, wherein receiving the request to publish the video content includes receiving an indication of a product to associate with the video content;
associating a product identifier of the product with the video content; and
publishing the video content, wherein publishing the video content comprises making the video content accessible via a content sharing platform.

2. The method of claim 1, wherein determining that the content creator profile satisfies the filtering criteria comprises determining that a number of product reviews associated with the content creator profile meets or exceeds a minimum threshold number.

3. The method of claim 1, further comprising:
determining one or more performance metrics associated with the video content, wherein the one or more performance metrics include at least one of: i) a number of links to the video content on one or more social networking profiles associated with the content creator profile, ii) a number of unique views of the video content, or iii) a number of purchases of the product that are associated with at least one unique view of the video content;
determining an amount of revenue based on the one or more performance metrics; and
providing the content creator profile with access to the amount of revenue.

4. A method, comprising:
receiving, from a first user device via a first entity profile, a request for bids to generate content, wherein the request for bids specifies filtering criteria, and wherein the filtering criteria includes a threshold amount of generated content targeted to a target demographic;
determining that an amount of content targeted to the target demographic generated by a second entity profile satisfies the filtering criteria;
providing the second entity profile with an indication of the request for bids;
receiving, from a second user device via the second entity profile, a bid proposal;
providing the first entity profile with access to the bid proposal;
receiving, via the first entity profile, an acceptance of the bid proposal;
receiving, via the second entity profile, the content;
providing the first entity profile with access to the content;
receiving, via the first entity profile, a request to publish the content;
associating a product identifier of a product with the content; and
publishing the content, wherein publishing the content comprises providing access to the content via a content sharing platform.

5. The method of claim 4, wherein the request for bids further specifies attribute information indicative of one or more desired attributes of the content, the method further comprising providing the second entity profile with access to the attribute information.

6. The method of claim 4, wherein the bid proposal comprises at least one of a text description of the content or sample content representative of the content.

7. The method of claim 4, wherein determining that the second entity profile satisfies the filtering criteria comprises determining that a number of product reviews associated with the second entity profile meets or exceeds a minimum threshold number.

8. The method of claim 4, wherein receiving the request to publish the content comprises receiving an indication of the product to associate with the video content.

9. The method of claim 8, further comprising:
determining one or more performance metrics associated with the content, wherein the one or more performance metrics comprise at least one of: i) a number of links to the content on one or more social networking profiles associated with the second entity profile, ii) a number of unique views of the content, or iii) a number of purchases of the product that are associated with at least one unique view of the content;
determining an amount of revenue based on the one or more performance metrics; and
providing the second entity profile with access to the amount of revenue.

10. The method of claim 4, wherein receiving the request for bids to generate content comprises receiving an indication of an event with which the content is to be associated.

11. A system, comprising:
at least one memory storing computer-executable instructions; and
at least one processor communicatively coupled to the at least one memory, wherein the at least one processor is configured to access the at least one memory and execute the computer-executable instructions to:
receive, from a first user device via a first entity profile, a request for bids to generate content, wherein the request for bids specifies filtering criteria, wherein the filtering criteria includes a threshold amount of generated content targeted to a target demographic;
determine that an amount of content targeted to the target demographic generated by a second entity profile satisfies the filtering criteria;
provide the second entity profile with an indication of the request for bids;
receive, from a second user device via the second entity profile, a bid proposal;
provide the first entity profile with access to the bid proposal;
receive, via the first entity profile, an acceptance of the bid proposal;
receive, via the second entity profile, the content;
provide the first entity profile with access to the content;
receive, via the first entity profile, a request to publish the content;

associating a product identifier of a product with the content; and publish the content, wherein publishing the content comprises providing access to the content via a content sharing platform.

12. The system of claim 11, wherein the request for bids further specifies attribute information indicative of one or more desired attributes of the content, and wherein the at least one processor is further configured to provide the second entity profile with access to the attribute information.

13. The system of claim 11, wherein the bid proposal comprises at least one of a text description of the content or sample content representative of the content.

14. The system of claim 11, wherein the at least one processor is configured to determine that the second entity profile satisfies the filtering criteria by executing the computer-executable instructions to determine that a number of product reviews associated with the second entity profile meets or exceeds a minimum threshold number.

15. The system of claim 11, wherein the request to publish the content comprises an indication of the product to associate with the video content.

16. The system of claim 15, wherein the at least one processor is further configured to execute the computer-executable instructions to:

determine one or more performance metrics associated with the content, wherein the one or more performance metrics comprise at least one of: i) a number of links to the content on one or more social networking profiles associated with the second entity profile, ii) a number of unique views of the content, or iii) a number of purchases of the product that are associated with at least one unique view of the content;

determine an amount of revenue based on the one or more performance metrics; and provide the content creator profile with access to the amount of revenue.

17. The system of claim 11, wherein the request for bids to generate content comprises an indication of an event with which the content is to be associated.

* * * * *